(12) United States Patent
Kinoshita et al.

(10) Patent No.: US 7,494,949 B2
(45) Date of Patent: Feb. 24, 2009

(54) SIC REFRACTORY COMPRISING SILICON NITRIDE BOND THERETO AND METHOD FOR PRODUCTION THEREOF

(75) Inventors: Toshiharu Kinoshita, Kakamigahara (JP); Tsuneo Komiyama, Toki (JP)

(73) Assignees: NGK Insulators, Ltd., Nagoya (JP); NGK Adrec Co., Ltd., Kani-gun (JP)

( * ) Notice: Subject to any disclaimer, the term of this patent is extended or adjusted under 35 U.S.C. 154(b) by 117 days.

(21) Appl. No.: 10/571,073

(22) PCT Filed: Jul. 23, 2004

(86) PCT No.: PCT/JP2004/010496

§ 371 (c)(1),
(2), (4) Date: Mar. 8, 2006

(87) PCT Pub. No.: WO2005/026076

PCT Pub. Date: Mar. 24, 2005

(65) Prior Publication Data

US 2006/0281625 A1    Dec. 14, 2006

(30) Foreign Application Priority Data

Sep. 9, 2003    (JP)    ............................. 2003-317022

(51) Int. Cl.
   *C04B 35/573*    (2006.01)
(52) U.S. Cl. ......................... 501/92; 501/97.2; 501/97.4
(58) Field of Classification Search .................... 501/92
   See application file for complete search history.

(56) References Cited

U.S. PATENT DOCUMENTS 4,578,363 A * 3/1986 Campos-Loriz .............. 501/89
4,690,790 A * 9/1987 Bates ........................... 264/636
4,937,211 A * 6/1990 Washburn ..................... 501/92
5,459,112 A * 10/1995 Kim ............................. 501/89
5,504,046 A * 4/1996 Kim ............................. 501/92
5,510,303 A * 4/1996 Kameda et al. ............... 501/92
5,521,129 A * 5/1996 Campos-Loriz et al. ....... 501/89
5,563,108 A * 10/1996 Kim ............................. 501/89
5,762,863 A * 6/1998 Kameda et al. .............. 264/640

FOREIGN PATENT DOCUMENTS

| GB | 2131411 | * | 6/1984 |
| JP | 59-146979 | | 8/1984 |
| JP | 61-201662 | | 9/1986 |
| JP | 03-223166 | | 10/1991 |
| JP | 4-114969 | * | 4/1992 |
| JP | 4-224169 | * | 8/1992 |
| JP | 07-033530 | | 2/1995 |
| JP | 02-284577 | | 10/2002 |

* cited by examiner

*Primary Examiner*—Karl E Group
(74) *Attorney, Agent, or Firm*—Burr & Brown

(57) ABSTRACT

A silicon nitride-bonded SiC refractory is provided, which includes SiC as a main phase and $Si_3N_4$ and/or $Si_2N_2O$ as a secondary phase and which has a bending strength of 150 to 300 MPa and a bulk density of 2.6 to 2.9. A method for producing a silicon nitride-bonded SiC refractory is also provided, which comprises a step of mixing 30 to 70% by mass of a SiC powder of 30 to 300 μm as an aggregate, 10 to 50% by mass of a SiC powder of 0.05 to 30 μm, 10 to 30% by mass of a Si powder of 0.05 to 30 μm, and 0.1 to 3% by mass, in terms of oxide, of at least one member selected from the group consisting of Al, Ca, Fe, Ti, Zr and Mg.

7 Claims, 1 Drawing Sheet

SIC REFRACTORY COMPRISING SILICON NITRIDE BOND THERETO AND METHOD FOR PRODUCTION THEREOF

CLAIM OF PRIORITY

This application claims priority under 35 USC 371 International Application No. PCT/JP2004/010496, filed on Jul. 23, 2004, which claims priority to Japanese Patent Application No. 2003-317022, filed Sep. 9, 2003, the entire contents of which are hereby incorated by reference.

TECHNICAL FIELD

The present invention relates to a silicon nitride-bonded SiC refractory material and a method for production thereof.

BACKGROUND ART

Silicon nitride (SiC) refractory materials are important in industry for the excellent heat resistance and refractoriness and are being used in a large amount in, for example, setters for firing tiles, pottery, honeycomb structures, etc.; kiln furniture for firing other than the setters; and saggers.

In firing a to-be-fired material to obtain a ceramic product (e.g. tiles, pottery or honeycomb structures), plurality of block-shaped pillars are generally placed on the corners of the respective setter floors to form a space that is necessary for uniform firing of to-be-fired material, setters and the pillars are alternately piled up to form a multi-layered setter, be-fired material is placed on each setter of the multi-layered setter, and firing is carried out.

Assembly of such a multi-layered setter has often been made manually. However, in recent years, automation and labor saving have been adopted in firing and production lines for ceramic product, and automation has been progressed in transfer of setter and produced articles.

As the base material for the setters and pillars constituting a multi-layered setter, there have been used mainly mullite, alumina and zirconia which can be used at high temperatures (e.g. 1,200 to 1,600° C.). They, however, are insufficient in strengths (bending strength and Young's modulus); therefore, oxide-bonded SiC refractory and nitride-bonded SiC refractory all having higher strengths are in use depending upon the application purposes.

In a multi-layered setter made of such an oxide-bonded SiC refractory or a nitride-bonded SiC refractory, however, it is necessary to make the thicknesses of the setter floors and pillars thick in order to obtain a strength capable of withstanding the external stress which appears at the time of assembling, use and disassembling of the multi-layered setter. This has resulted in a larger weight and lower operating efficiency, a larger heat capacity which makes it difficult to well respond to a recent years' requirement for energy saving, and a lower thermal conductivity which makes difficult the uniform heating of to-be-fired material.

In order to secure the oxidation resistance and strength required for the above-mentioned refractory, a bulk density of 2.6 or more is necessary, and oxides such as alumina and iron oxide have ordinarily been added in an amount of 3 to 10% by mass. When alumina and an iron oxide are added in an amount of 3 to 10% by mass, the amount of glass phase at the bonding portion between SiC and added oxide increases, which contributes to a reduction in creep resistance otherwise required for a refractory material and resusts in a shorter useful life. Further, alumina and an iron oxide have a dispersion effect in compounding raw materials, and also act as a sintering aid; therefore, in the conventional method, when the amount of alumina and an iron oxide added was reduced to 3% or less, there was a problem in the reduction of the bulk density and insufficient strength.

For solving the above problems, there is in use a multi-layered setter made of a (porous or dense) Si-containing material containing, as a metallic Si phase, Si high in strength and superior in heat resistance, oxidation resistance and thermal conductivity; for example, a metallic silicon-silicon carbide composite material (a Si-impregnated SiC refractory) containing Si and SiC as main phases.

In the case of a multi-layered setter made of such a Si-impregnated SiC refractory, the setter and pillars can be thinner and lighter; therefore, a higher operating efficiency and incresed energy saving are expected, and it is possible to obtain a longer useful life and better recycling of setter.

In the case of the multi-layered setter made of a Si-impregnated SiC, however, the use at high temperatures, for example, at 1,400 to 1,600° C. is difficult because the upper limit of temperature for practical use of the base material, the Si-impregnated SiC is less than 1,400° C.

The present invention has been made in view of the above-mentioned problems of prior art and aims at providing a silicon nitride-bonded SiC refractory which has heat resistance, thermal shock resistance and oxidation resistance and which is high in strength and superior in creep resistance and thermal conductivity, and a method for producing such a silicon nitride-bonded SiC refractory.

SUMMARY OF THE INVENTION

According to the present invention, there is provided a silicon nitride-bonded SiC refractory, characterized in that it contains SiC as a main phase and $Si_3N_4$ and/or $Si_2N_2O$ as a secondary phase and that it has a bending strength of 150 to 300 MPa and a bulk density of 2.6 to 2.9.

In the present invention, it is preferred that fine particles of SiC powder having a size of 0.1 to 1 μm is uniformly dispersed around SiC aggregates constituting the main phase.

In the present invention, it is preferred that at least one of the following conditions (1) to (5) is satisfied:
(1) the Young's modulus thereof is 100 to 500 GPa;
(2) the thermal conductivity thereof is 20 to 80 W/(m·K);
(3) at least one member selected from the group consisting of Al, Ca, Fe, Ti, Zr and Mg is contained in an amount of 0.1 to 3% by mass in terms of oxide;
(4) the largest particle diameter of SiC aggregates constituting the main phase is 50 to 300 μm; and
(5) it contains SiC in an amount of 60 to 90% by mass and $Si_3N_4$ and/or $Si_2N_2O$ in an amount of 10 to 40% by mass.

According to the present invention, there is also provided a method for producing a silicon nitride-bonded SiC refractory, characterized in that the method comprises a step of mixing
30 to 70% by mass of a SiC powder of 30 to 300 μm as an aggregate,
10 to 50% by mass of a SiC powder of 0.05 to 30 μm,
10 to 30% by mass of a Si powder of 0.05 to 30 μm, and
0.1 to 3% by mass, in terms of oxide, of at least one member selected from the group consisting of Al, Ca, Fe, Ti, Zr and Mg.

In the above method, the forming step is preferably conducted by slip casting.

In the above method, heat treatment is preferably conducted at 1,350° C. to 1,500° C. in a substantially nitrogen atmosphere. In this case, it is preferred that heat treatment is conducted at 1,350° C. to 1,500° C. in a nitrogen atmosphere containing 0.01 to 2.00% of oxygen.

In the above method, it is preferred that heat treatment is conducted in the nitrogen atmosphere and then a heat treatment is conducted at 1,300 to 1,500° C. in air.

DETAILED DESCRIPTION OF THE INVENTION

Figure 1:
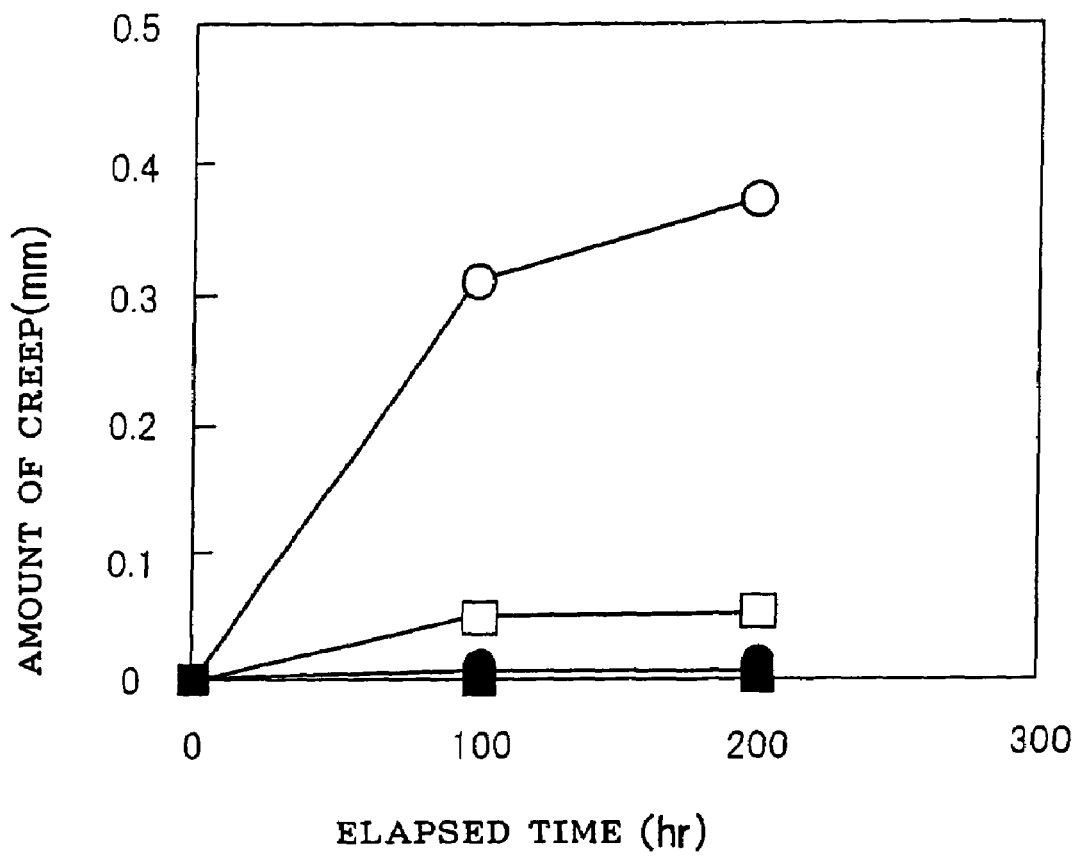
FIG. 1 is a graph showing the result of a test for creep resistance, wherein the amount (mm) of creep is plotted against the lapse of time (hr).
Figure 1:
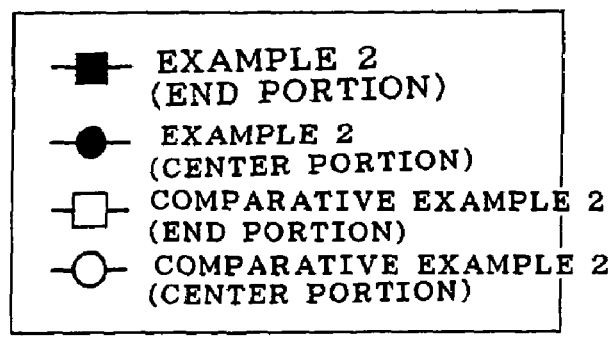

The silicon nitride-bonded SiC refractory of the present invention contains SiC as a main phase and $Si_3N_4$ and/or $Si_2N_2O$ as a secondary phase and has a bending strength of at least 150 MPa and a bulk density of at least 2.6. The bending strength is preferably 150 to 300 MPa because such a silicon nitride-bonded SiC refractory can be suitably used in, for example, the setter and pillar constituting a multi-layered setter. The bulk density is preferably 2.6 to 2.9. This is because the oxidation of the refractory proceeds easily, since the area of the refractory contacting with oxygen increases during the use of the refractory at high temperatures due to the increase in the number of the internal pores of the refractory material, and the increase in the inner surface area of the pores if the bulk density is small.

In the present invention, it is preferred that fine particles of SiC powder having a size of 1 μm or less, preferably 0.1 to 1 μm are uniformly dispersed around SiC aggregates constituting the main phase. The reason is as follows. When SiC particles are filled, gaps ordinarily remain between the particles, however, when fine particles of SiC powder having a size of 1 μm or less are uniformly dispersed, even the gaps of 1 μm or less are filled with the fine particles of SiC powder, whereby it is possible to obtain nearly the closest packing state, and a higher density can also be achieved.

The amount of the remaining fine pores greatly affects the inner surface area (specific surface area) of the open pores inside the base material and accordingly also the oxidation resistance of the base material. By uniformly dispersing fine particles of SiC powder having a size of 1 μm or less around the SiC aggregates and filling the fine pores with the fine particles of SiC powder, the oxidation resistance of the base material as well can be increased.

It is preferable that, in the case of the refractory of the present invention, the Young's modulus is 100 GPa or more, more preferably 100 to 500 GPa. The reason therefor is as follows. When the present refractory is used in, for example the setter floor and pillars constituting a multi-layered setter and particularly at the time of assembling the multi-layered setter and mounting a to-be-fired material on each setter, each setter and each pillar show no large deformation against an external stress applied; thus, the multi-layered setter has a higher stability and the strain of each setter is small, and there can be obtained a ceramic product of higher quality.

The refractory of the present invention has a thermal conductivity of preferably at least 20 W/(m·K), more preferably 20 to 80 W/(m·K), because a high thermal conductivity enables uniform heating of a to-be-fired material at high temperatures and can give a fired material of higher quality.

The refractory of the present invention is preferred to contain at least one member selected from the group consisting of Al, Ca, Fe, Ti, Zr and Mg, in an amount of 0.1 to 3% by mass in terms of oxide, from the standpoint of oxidation resistance, thermal shock resistance, control of the amount of cristobalite to be formed, and control of the amount of glass phase to be formed. In the refractory of the present invention, it is preferred that the content of alumina ($Al_2O_3$) in the raw material composition, when measured by fluorescent X-ray analysis, is particularly 0.05 to 1.5% by mass in terms of oxide and the content of alumina+iron oxide [$Al_2O_3+Fe_2O_3$] is particularly preferably 0.5 to 2.0% by mass in terms of oxide.

In the refractory of the present invention, it is also preferred that the SiC aggregates constituting the main phase have a particle diameter of 50 to 300 μm. The reason therefor is that when SiC particles of 50 μm or more are present in the refractory, the development of microcracks at the time when a thermal stress is applied to the refractory would be stopped by such particles if such particles exist in the structure. In contrast, in the case of SiC particles of less than 50 μm, cracks tend to appear at the grain boundary and grow rapidly, which results in a reduction in thermal shock resistance. Meanwhile, when the particle diameter of the SiC aggregate is more than 300 μm, it is not easy to obtain a sufficient thermal shock resistance and sufficient strengths (e.g., a sufficient bending stress and Young's modulus).

Further, the refractory of the present invention is preferred to contain SiC in an amount of 60 to 90% by mass and $Si_3N_4$ and/or $Si_2N_2O$ in an amount of 10 to 40% by mass. The reason therefor is as follows. The present refractory contains SiC as an aggregate and, at the bonding portion, $Si_3N_4$ and/or $Si_2N_2O$ as a secondary phase. When the amount of the main phase (SiC) is below the above range, it is difficult to obtain a sufficient thermal shock resistance and sufficient strengths (a sufficient bending strength and Young's modulus). When the amount is above the range, the amount of the secondary phase forming the bonding portion is small and no sufficient strength is obtained. $Si_3N_4$ and/or $Si_2N_2O$ as a secondary phase are used for the purpose of attaining the strength by bonding the main phase, however, when the amount of the secondary phase is large, the balance between the main phase and the secondary phase is lost and it is difficult to obtain a sufficient thermal shock resistance and sufficient strengths (a sufficient bending strength and Young's modulus). When the amount of the secondary phase is small, no sufficient strength is obtained.

As described above, the refractory of the present invention has heat resistance, thermal shock resistance and oxidation resistance and is high in strength and superior in creep resistance. More specifically explaining, the refractory of the present invention has a temperature (about 1,600° C.) close to the use temperature of oxide-bonded SiC refractory or nitride-bonded SiC refractory and a strength (about 225 to 250 MPa) close to the strength of Si-impregnated SiC, and can possess both advantages at least one of that the respective conventional refractory can have.

Next, description is made of a method for producing the silicon nitride-bonded refractory of the present invention. The refractory of the present invention is produced ordinarily by steps of [1] compounding of raw materials, [2] mixing, [3] slip casting, [4] demolding, [5] drying, [6] firing (firing in nitrogen atmosphere ([6]-1) and firing in oxidative condition ([6]-2)), and [7] inspection. Herein, the main feature of the method for producing the refractory of the present invention lies in that the method includes steps [1] and [2], wherein 30 to 70% by mass of a SiC powder of 30 to 300 μm as an aggregate, 10 to 50% by mass of a SiC powder of 0.05 to 30 μm, 10 to 30% by mass of a Si powder of 0.05 to 30 μm, and 0.1 to 3% by mass, in terms of oxide, of at least one member selected from the group consisting of Al, Ca, Fe, Ti, Zr and Mg are mixed. When the inorganic oxide(s) is (are) used in a large amount, the amount of the glass phase to be formed at grain boundaries is large and the required creep resistance of refractory material during the use is lowered, resulting in a short life.

In the method for producing the refractory of the present invention, it is preferred that Si powder is added in the compounding of raw materials (step [1]), because the Si can be dispersed uniformly around the SiC aggregates. In the method for producing the refractory of the present invention, it is also preferred that of the inorganic oxides (Al, Ca, Fe, Ti, Zr and Mg), at least $Al_2O_3$, $Fe_2O_3$ and $Na_2O$ are used in amounts of 0.05 to 2.0% by mass, 0.05 to 1.0% by mass and less than 0.1% by mass, respectively. Further in the method for producing the refractory of the present invention, by adding fine particles of SiC powder having a size of 1 μmn or less in particle diameter in an amount of 10 to 30% by mass, the resulting refractory material can have an increased density (a higher denseness). In conventional compounding, the resulting refractory had a low density when the amount of the inorganic oxide used was 3% by mass or less; in the present method, however, by adding fine particles of SiC powder, a high bulk density of 2.6 or more can be obtained even when the amount of the inorganic oxide used is small.

Also in the method for producing the refractory of the present invention, the forming step is preferably conducted by slip casting (step [3]). Thereby, the resulting formed material has an increased denseness and the refractory after firing can have increased strengths (an increased bending strength and Young's modulus).

In the method for producing the refractory of the present invention, it is also preferred that firing is conducted in a substantially nitrogen atmosphere at 1,350° C. to 1,500° C. and the firing time is 1 to 30 hours (step [6]-1). Thereby, the Si in the formed material reacts with the nitrogen present in the firing atmosphere. Silicon nitride and a silicon oxynitride (are formed, due to the presence of a very small amount of oxygen in the substantially nitrogen atmosphere), at the grain boundaries of SiC. These compounds can bond the SiC aggregate.

The oxygen concentration in the nitrogen atmosphere when the heat treatment (firing) is conducted at 1,350 to 1,500° C., is preferred to be 0.01 to 2.00%. The reason therefor is that the presence of a very small amount of oxygen allows formation of a silicon oxynitride and enables stronger bonding of SiC grain boundaries. Incidentally, a nitrogen content of less than 90% by volume in the nitrogen atmosphere is not preferred because it causes delay of nitride formation speed, or insufficient nitride formation due to the presence of oxygen, or oxidation of the raw materials, during the heat treatment.

In the method for producing the refractory of the present invention, it is further preferred that after the firing in a nitrogen atmosphere (step [6]-1), a heat treatment is conducted in the air at 1,300° C. to 1,500° C. (step [6]-2). The reason is that the heat treatment can form a strong oxide film on the surface of the obtained refractory, whereby the oxidation and deterioration of the resulting refractory is suppressed even when the material is continuously used at high temperatures for a long time and there can be obtained an extremely high thermal shock resistance of substantially no deformation or bulging or cracking.

When the oxidation temperature is less than 1,300° C., a sufficient oxide film is not formed, and oxidation resistance is not obtained. Meanwhile, when the oxidation temperature is more than 1,500° C., oxidation takes place violently during the formation of an oxide film, a gas generating from the oxidation is taken into the oxide film formed and the oxide film has pores, therefore, sufficient oxidation resistance may not be obtained.

Incidentally, the refractory of the present invention needs no heat treatment when used at temperatures of 1,300° C. or higher, but is preferably subjected to a heat treatment when used at temperatures lower than 1,300° C.

Hereinafter, the present invention is described in more detail based on Examples. However, the present invention is in no way restricted to these Examples.

EXAMPLE 1

The raw materials shown in Table 1, that is, a SiC powder, a Si powder, $Fe_2O_3$, $Al_2O_3$, a dispersing agent and ion-exchanged water were compounded in a compounding ratio (mass %) shown in Table 1 (compounding of raw materials [1]).

TABLE 1

| Component (particle diameter) | | Compounding ratio (mass %) |
|---|---|---|
| SIC | 100 μm | 47.00 |
|  | 3 μm | 10.00 |
|  | 1 μm | 24.50 |
|  | 1 μm > | 1.00 |
| Si |  | 17.00 |
| $Fe_2O_3$ |  | 0.50 |
| $Al_2O_3$ |  | 0.50 |
| Dispersing agent |  | 0.15 |
| Water |  | 13.00 |

The compounded raw materials were placed in a trommel and mixed to obtain uniform slurry and simultaneously disintegrate the secondary particles and primary particles of raw material particles in the slurry (mixing [2]). The trommel mixing was conducted for about 20 hours with 100 kg per batch.

The slurry obtained by the trommel mixing was poured into a gypsum mold and the water in the slurry was absorbed by the gypsum mold to accrete a green article having an intended thickness to the surface thereof, whereby a cast article was obtained (forming (slip casting) [3]).

The formed article was taken out of the gypsum mold and the water in the formed article was removed by drying (demolding [4] and drying [5]).

The dried formed article was fired in a nitrogen atmosphere at 1,450° C. for 10 hours (firing in nitrogen atmosphere ([6]-1)). Then, the fired article was fired in the air at 1,450° C. for 10 hours (firing in oxidative condition ([6]-2)).

Lastly, the resulting refractory was inspected for dimension and crack formation (visual check) (inspection [7]), and then measured for bending strength, Young's modulus, bulk density, porosity, thermal conductivity and grinding force, and evaluated for processability. The results are shown in Table 2.

COMPARATIVE EXAMPLE 1

A known conventional Si-impregnated SiC refractory (NEWSIC, the trademark of a product of NGK Insulators, Inc.) was measured for bending strength, Young's modulus, bulk density, porosity, thermal conductivity and maximal usable temperature, and evaluated for firing deformation and processability. The results are shown in Table 2.

TABLE 2

|  | Example 1 | Comparative Example 1 |
|---|---|---|
| Bending strength (MPa) | 200 | 250 |
| Young's modulus (GPa) | 240 | 350 |
| Bulk density (g/cc) | 2.80 | 3.00 |
| Porosity (%) | 10.0 | 0.0 |
| Thermalconductivity (W/mK) | 30 | 180 |
| Maximal usable temperature (° C.) | 1500 | 1350 |
| Firing deformation | Small | Present |
| Grinding (N) | 60 | 60 |
| Processability | With slight difficulty | With difficulty |

Discussion for Example 1 and Comparative Example 1

As appreciated from the results of Table 2, Example 1, as compared with Comparative Example 1, was slightly inferior in strengths (bending strength and Young's modulus) but was sufficient as a base material for the setters and pillars constituting a multi-layered setter. Further, Example 1, as compared with Comparative Example 1, was high in the maximal usable temperature and therefore is considered to be applicable to a multi-layered setter for higher-temperature firing. Furthermore, Example 1 was small in firing deformation and therefore needed substantially no grinding. Meanwhile, in Comparative Example 1, there was firing deformation and the processing was difficult; therefore, a time and labor were needed for correction of deformation, which would suggest a possible increase in cost.

EXAMPLE 2 AND COMPARATIVE EXAMPLE 2

There were prepared two kinds of silicon nitride-bonded SiC refractory each having the composition (in terms of oxide) shown in Table 3, which was obtained by chemical analysis. They were each subjected to compositional analysis by fluorescent X-ray analysis, qualitative analysis of crystalline phase by XRD, and creep resistance test. The results are shown in Table 3 and FIG. 1. In Table 3 and FIG. 1, one is a silicon nitride-bonded SiC refractory obtained by the same production method as in Example 1 (Example 2), and the other is a known conventional silicon nitride-bonded SiC refractory (Comparative Example 2).

TABLE 3

|  | Composition | Example 2 | Comparative Example 2 |
|---|---|---|---|
| Compositional analysis (in terms of oxide) (mass %) | SiC | 72.30 | 70.40 |
|  | $Si_3N_4$ | 24.20 | 23.60 |
|  | $Al_2O_3$ | 1.20 | 4.60 |
|  | $Fe_2O_3$ | 0.60 | 0.40 |
|  | F—$SiO_2$ | 1.75 | 1.08 |
| Qualitative analysis of crystalline phase by XRD Much ← → Little ● ◎ ○ △ | SiC | ● | ● |
|  | $\alpha$-$Si_3N_4$ | ◎ | △ |
|  | $\beta$-$Si_3N_4$ | ○ | — |
|  | $\beta$-$Si_5AlON_7$ ($\beta$-sialon) | — | ◎ |
|  | $Si_2N_2O$ | △ | — |
|  | $SiO_2$ | △ | △ |
|  | $Al_2O_3$ (corundum) | — | ○ |

The creep resistance test was conducted under the following conditions.

Test temperature: 1,400° C.×200 hours
Shape of test sample: 10 mm×2 mm×120 mm (length)
Stress: 1 MPa
Tested positions: the end and center of test sample

Discussion for Example 2 and Comparative Example 2

As is clear from the results (FIG. 1) of the creep test for Example 2 and Comparative Example 2, it has been confirmed that the creep resistance of Example 2 was much superior to that of Comparative Example 2. Further in Example 2, it has been confirmed the content of alumina ($Al_2O_3$) in compositional analysis was far smaller than in Comparative Example 2, as shown in Table 3. Furthermore in Example 2, as shown in the qualitative analysis of crystalline phase by XRD, of Table 3, there was present no crystalline phase of $\beta$-$Si_5AlON_7$ ($\beta$-sialon) or $Al_2O_3$ (corundum) (these phases were present in Comparative Example 2); the amount of the crystalline phase of $\alpha$-$Si_3N_4$ was more, than in Comparative Example 2; and there were present the crystalline phases of $\beta$-$Si_3N_4$ and $Si_2N_2O$ which were not present in Comparative Example 2. From the above, it is presumed that in Example 2, since the amount of alumina ($Al_2O_3$) was controlled at a necessary but minimum level at the step of compounding of raw materials, there was no increase in glass phase at the boundary of crystalline phase and a reduction in creep resistance could be suppressed greatly.

INDUSTRIAL APPLICABILITY

The silicon nitride-bonded SiC refractory material obtained by the production method of the present invention can be suitably used as a setter and pillar constituting the multi-layered setter used in firing of a to-be-fired material for obtaining a ceramic product (e.g. tile, pottery or honeycomb structure).

The invention claimed is:

1. A silicon nitride-bonded SiC refractory comprising:
SiC as a main phase and $Si_3N_4$ and/or $Si_2N_2O$ as a secondary phase, and having a bending strength of 150 to 300 MPa, a bulk density of 2.6 to 2.9, and a thermal conductivity of 20 to 80 W/(m·K);
wherein said silicon nitride-bonded SiC refractory is formed from a mixture that includes SiC powder having a particle diameter of 30 to 300 μm as aggregate particles in an amount of 30 to 70 mass % constituting the main phase, SiC powder having a particle diameter of 0.05 to 30 μm in amount of 10 to 50 mass %, Si powder having a particle size of 0.05 to 30 μm in an amount of 10 to 30 mass %, and at least one material selected from the group consisting of Al, Ca, Fe, Ti, Zr and Mg in an amount of 0.05 to 3 mass % in terms of an oxide; and
wherein an amount of creep exhibited by said silicon nitride-bonded SiC refractory at a temperature of 1400° C. and a holding time of 200 hours is less than 0.1 mm.

2. The silicon nitride-bonded SiC refractory according to claim 1, wherein fine particles of SiC powder having a particle size of 0.1 to 1 μm are uniformly dispersed around the SiC aggregate particles constituting the main phase.

3. The silicon nitride-bonded SiC refractory according to claim 1, which has a Young's modulus of 100 to 500 GPa.

4. The silicon nitride-bonded SiC refractory according to claim 1, wherein the at least one member selected from the group consisting of AL, Ca, Fe, Ti, Zr and Mg is present in an amount of 0.1 to 3% by mass in terms of oxide.

5. The silicon nitride-bonded SiC refractory according to claim 1, wherein a particle diameter of the SiC aggregate constituting the main phase is 50 to 300 μm.

6. The silicon nitride-bonded SiC refractory according to claim 1, wherein the SiC is present in an amount of 60 to 90 mass % and at least one of $Si_3N_4$ and $Si_2N_2O$ is present in an amount of 10 to 40 mass %.

7. A silicon nitride-bonded SiC refractory comprising:

SiC aggregates defining a main phase; and at least one of $Si_3N_4$ and $Si_2N_2O$ defining a secondary phase present at a bonding portion of said SiC aggregates of said main phase;

wherein said silicon nitride-bonded SiC refractory has a bending strength of 150 to 300 MPa, a bulk density of 2.6 to 2.9, and a thermal conductivity of 20 to 80 W/(m·K);

wherein an amount of creep exhibited by said silicon nitride-bonded SiC refractory at a temperature of 1400° C. and a holding time of 200 hours is less than 0.1 mm; and wherein said silicon nitride-bonded SiC refractory is formed from a mixture including SiC powder having a particle diameter of 30 to 300 μm as aggregate particles in an amount of 30 to 70 mass % constituting the main phase, SiC powder having a particle diameter of 0.05 to 30 μm in amount of 10 to 50 mass %, Si powder having a particle size of 0.05 to 30 μm in an amount of 10 to 30 mass %, and at least one material selected from the group consisting of Al, Ca, Fe, Ti, Zr and Mg in an amount of 0.05 to 3 mass % in terms of an oxide.

* * * * *